(12) United States Patent
Gray et al.

(10) Patent No.: US 11,140,804 B2
(45) Date of Patent: *Oct. 12, 2021

(54) ANGLE ADJUSTABLE COULTER WHEEL ASSEMBLY

(71) Applicant: Salford Group Inc., Salford (CA)

(72) Inventors: Geof J. Gray, Burford (CA); John Mark Averink, Norwich (CA); Jake A. Rozendaal, Salford (CA); Frens Hoeve, Tillsonburg (CA); Simon Goveia, Mossley (CA)

(73) Assignee: Salford Group Inc., Salford (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,271

(22) Filed: Feb. 1, 2019

(65) Prior Publication Data
US 2019/0159395 A1    May 30, 2019

Related U.S. Application Data

(63) Continuation of application No. 15/110,114, filed on Jul. 7, 2016, now Pat. No. 10,238,022, which is a
(Continued)

(51) Int. Cl.
*A01B 63/00* (2006.01)
*A01B 5/00* (2006.01)
(Continued)

(52) U.S. Cl.
CPC .............. *A01B 63/002* (2013.01); *A01B 5/00* (2013.01); *A01B 15/18* (2013.01); *G06Q 20/28* (2013.01);
(Continued)

(58) Field of Classification Search
CPC ....... A01B 5/08; A01B 21/086; A01B 21/083; A01B 21/08; A01B 23/046; A01B 49/02;
(Continued)

(56) References Cited

U.S. PATENT DOCUMENTS

| | | |
|---|---|---|
| 1,225,853 A | 5/1917 | Pidgeon |
| 1,817,851 A | 8/1931 | Shelton |
| (Continued) | | |

FOREIGN PATENT DOCUMENTS

| | | |
|---|---|---|
| DE | 2903620 A1 | 8/1980 |
| DE | 9102567 U1 | 5/1991 |
| (Continued) | | |

OTHER PUBLICATIONS

Coulter Disk Series II—Gates Manufacturing—A New, More Universal Tool, Mar. 23, 2015, pp. 1-2.
(Continued)

*Primary Examiner* — Thomas B Will
*Assistant Examiner* — Joan D Misa
(74) *Attorney, Agent, or Firm* — Brunet & Co. Ltd.; Robert Brunet; Hans Koenig

(57) ABSTRACT

An angle adjustable coulter wheel assembly includes a rotatable shank having a longitudinal axis defined by an upper portion of the shank. The longitudinal axis is oriented neither vertically or horizontally with respect to the ground when the assembly is mounted on a tillage apparatus. A coulter wheel rotatably mounted on the shank proximate a lower portion of the shank. An actuator rotates the upper portion of the shank about the longitudinal axis to cause the face of the coulter wheel to rotate about three orthogonal axes thereby changing orientation of the face of the coulter wheel with respect to the ground when the assembly is on the tillage apparatus. The coulter wheel assembly permits adjusting the angle of the coulter wheel in at least two planes permitting greater control over how much soil the coulter wheel disturbs during tilling.

22 Claims, 12 Drawing Sheets

Related U.S. Application Data continuation of application No. PCT/CA2015/050013, filed on Jan. 9, 2015.

(60) Provisional application No. 61/625,402, filed on Jan. 9, 2014.

(51) Int. Cl.
*A01B 15/18* (2006.01)
*G06Q 30/00* (2012.01)
*G06Q 30/06* (2012.01)
*G06Q 20/28* (2012.01)
*G07F 7/06* (2006.01)

(52) U.S. Cl.
CPC ..... *G06Q 30/0185* (2013.01); *G06Q 30/0601* (2013.01); *G06Q 30/0609* (2013.01); *G06Q 30/0619* (2013.01); *G07F 7/06* (2013.01)

(58) Field of Classification Search
CPC ....... A01B 61/046; A01B 63/22; A01B 63/32; A01B 69/004; A01B 35/16; A01B 35/28; A01B 63/002; A01B 15/18; A01B 5/00
USPC ....... 172/573, 572, 569, 574, 603, 604, 739, 172/245, 383, 413, 567, 6, 26, 190, 5
See application file for complete search history.

(56) References Cited

U.S. PATENT DOCUMENTS

| | | | |
|---|---|---|---|
| 2,211,675 A | 8/1940 | Rushbrook | |
| 2,320,742 A | 6/1943 | Newkirk | |
| 2,352,963 A | 7/1944 | McMahon | |
| 2,613,586 A | 10/1952 | Boenig | |
| 2,664,040 A | 12/1953 | Beard | |
| 2,952,324 A | 9/1960 | Shumaker | |
| 2,998,083 A | 8/1961 | van der Lely | |
| 3,061,018 A | 10/1962 | Olson | |
| 3,171,243 A | 3/1965 | Johnston | |
| 3,296,985 A | 1/1967 | Shelton | |
| 3,486,566 A | 12/1969 | Nja | |
| 3,493,055 A | 2/1970 | Van Peursem | |
| 3,627,061 A | 12/1971 | Sample | |
| 3,640,348 A | 2/1972 | Womble | |
| 3,650,334 A | 3/1972 | Hagenstad | |
| 4,004,640 A | 1/1977 | Bland | |
| 4,063,598 A | 12/1977 | Boldrin | |
| 4,094,363 A | 6/1978 | McCoomb | |
| 4,128,130 A | 12/1978 | Green | |
| 4,185,699 A | 1/1980 | Lewison | |
| 4,228,860 A | 10/1980 | Orthman | |
| 4,333,535 A | 6/1982 | Hentrich, Sr. | |
| 4,396,070 A | 8/1983 | Brandner | |
| 4,407,372 A | 10/1983 | Rozeboom | |
| 4,412,588 A | 11/1983 | van der Lely | |
| 4,452,319 A | 6/1984 | Miguet | |
| 4,520,875 A | 6/1985 | Deckler | |
| 4,520,878 A | 6/1985 | Smith | |
| 4,589,497 A | 5/1986 | Kovar | |
| 4,694,759 A | 9/1987 | Dreyer | |
| 4,724,910 A | 2/1988 | Wheeler | |
| 4,745,978 A | 5/1988 | Williamson | |
| 4,759,411 A | 7/1988 | Williamson | |
| 4,796,550 A | 1/1989 | Van Natta | |
| 4,828,042 A | 5/1989 | Arnold | |
| 5,042,590 A | 8/1991 | Bierl | |
| 5,267,619 A | 12/1993 | Eversole | |
| 5,443,126 A | 8/1995 | Skjveland | |
| 5,450,908 A | 9/1995 | Hagman | |
| 5,458,203 A * | 10/1995 | Evers ..................... | A01B 21/08 172/569 |
| 5,482,121 A | 1/1996 | Draney | |
| 5,678,930 A | 10/1997 | Kreftmeyer | |
| 6,158,523 A | 12/2000 | Gengler | |
| 6,412,571 B1 | 7/2002 | McIlhargey | |
| 6,695,069 B2 | 2/2004 | Rozendaal | |
| 7,520,338 B2 | 4/2009 | Stokes | |
| 7,762,345 B2 | 7/2010 | Rozendaal | |
| 8,113,295 B2 | 2/2012 | Rozendaal et al. | |
| 8,307,909 B1 | 11/2012 | Rozendaal et al. | |
| 8,365,837 B2 | 2/2013 | Gray et al. | |
| 9,313,937 B2 * | 4/2016 | Gray ...................... | A01B 5/08 |
| 2007/0261865 A1 | 11/2007 | Taege et al. | |
| 2011/0132628 A1 | 6/2011 | Gray et al. | |

FOREIGN PATENT DOCUMENTS

| | | |
|---|---|---|
| DE | 19630079 A1 | 1/1998 |
| DE | 10137624 B4 | 4/2006 |
| FR | 2882216 A1 | 8/2006 |
| WO | 2004/077926 A2 | 9/2004 |

OTHER PUBLICATIONS

International Preliminary Report on Patentability on PCT/CA2015/050013 dated Jul. 21, 2016.
Office Action dated Mar. 28, 2018 on U.S. Appl. No. 15/1101114.

* cited by examiner

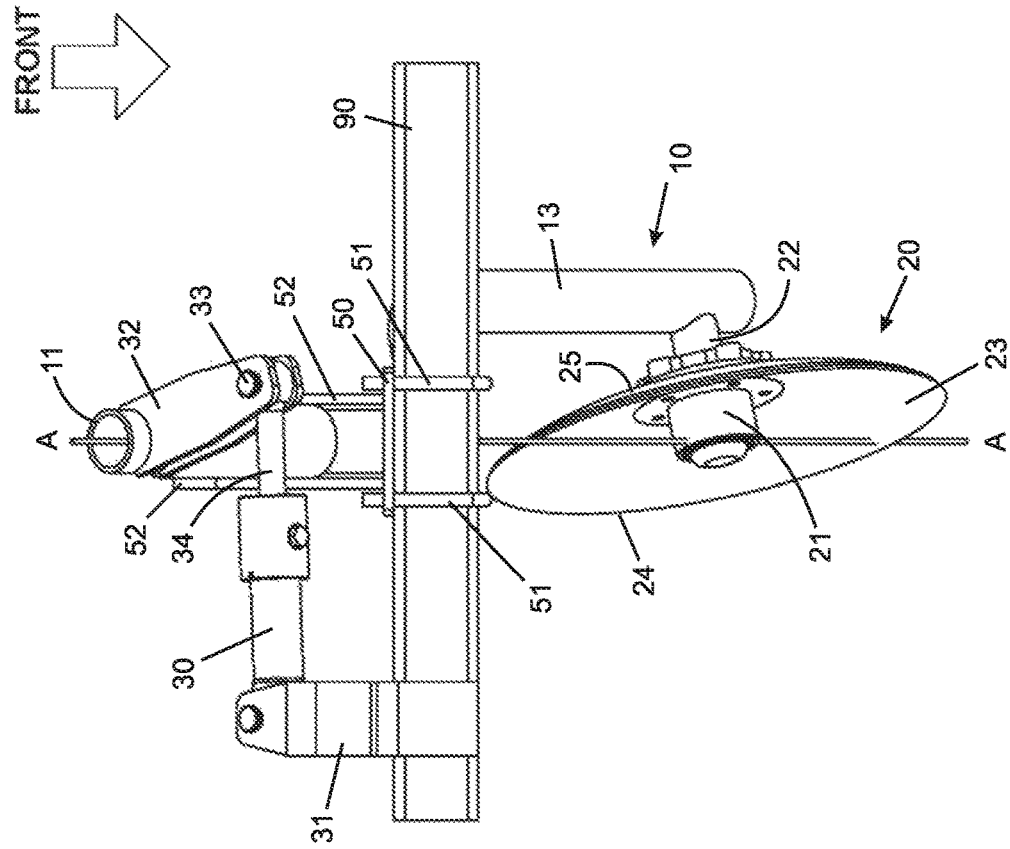
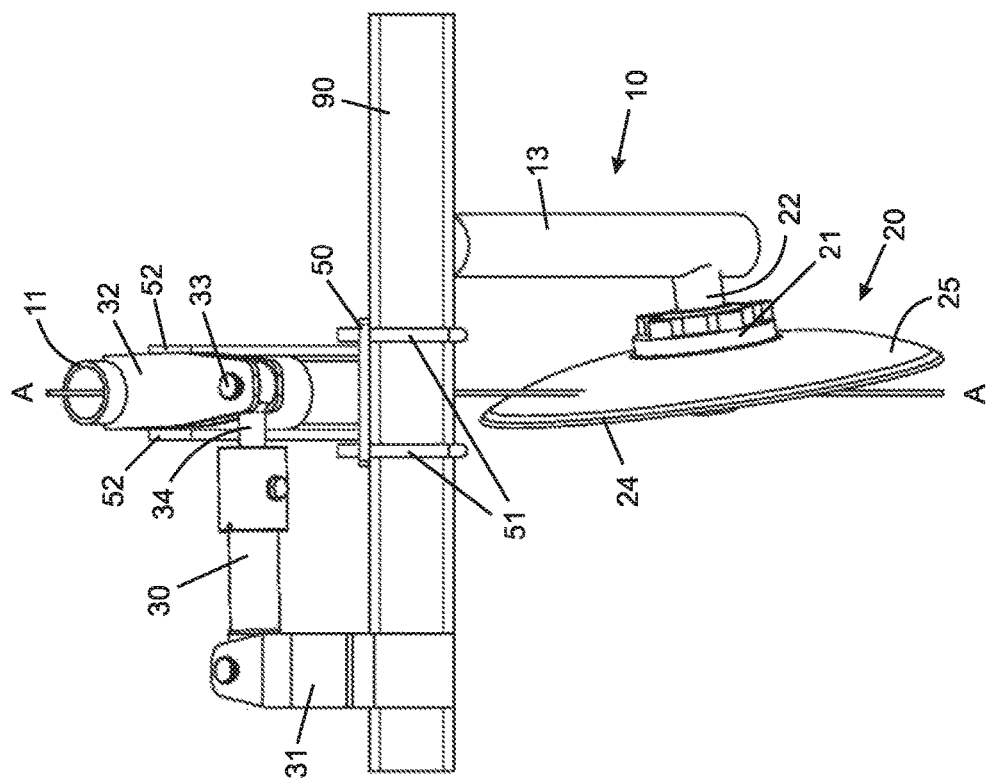
Fig. 2A
Fig. 2B

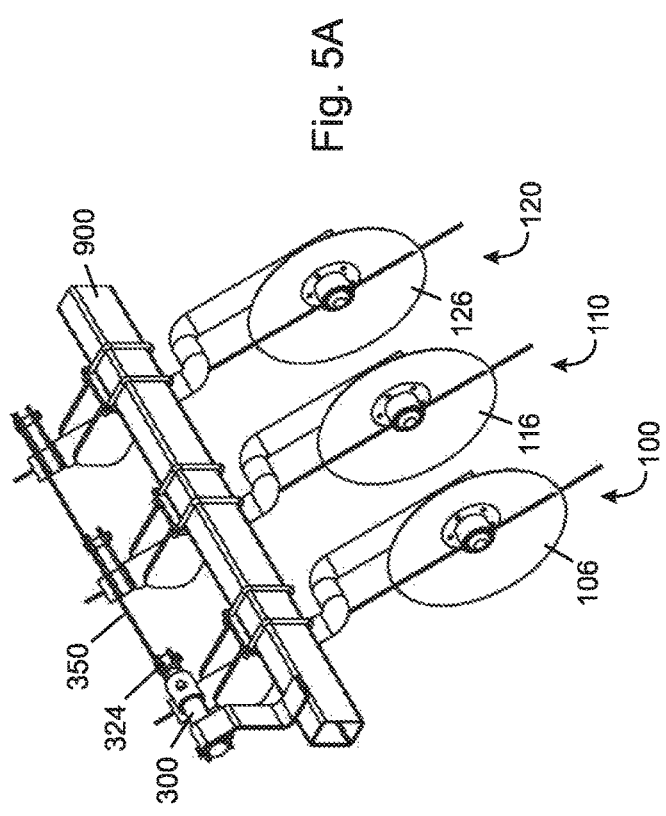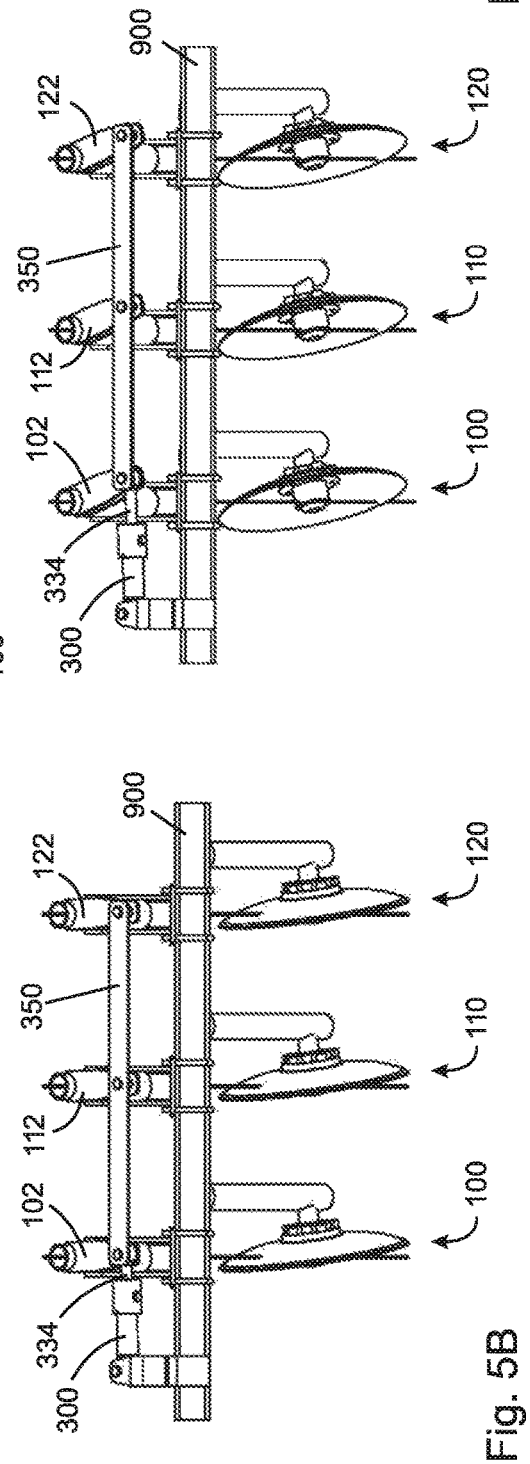

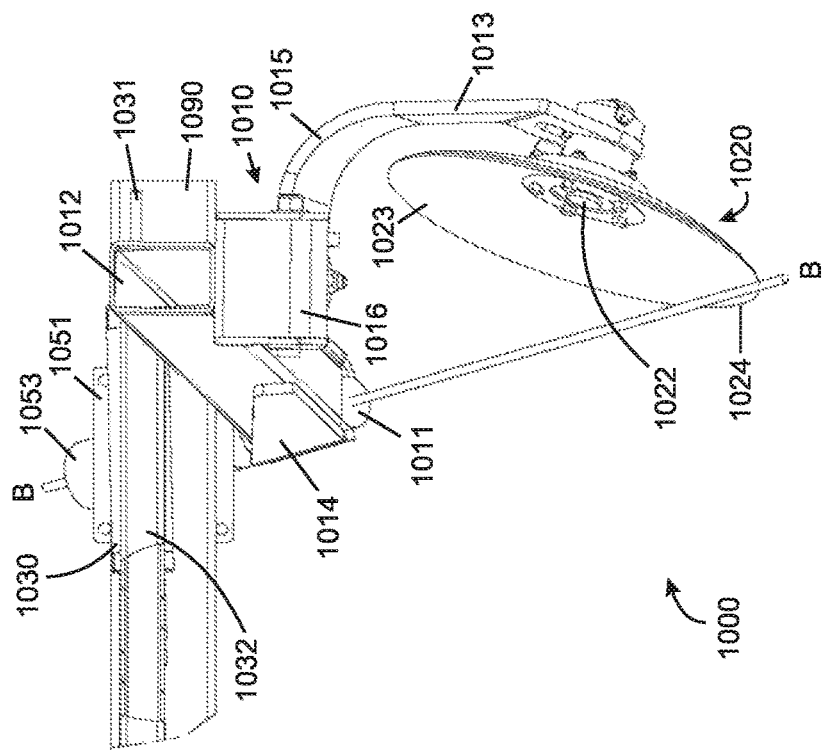
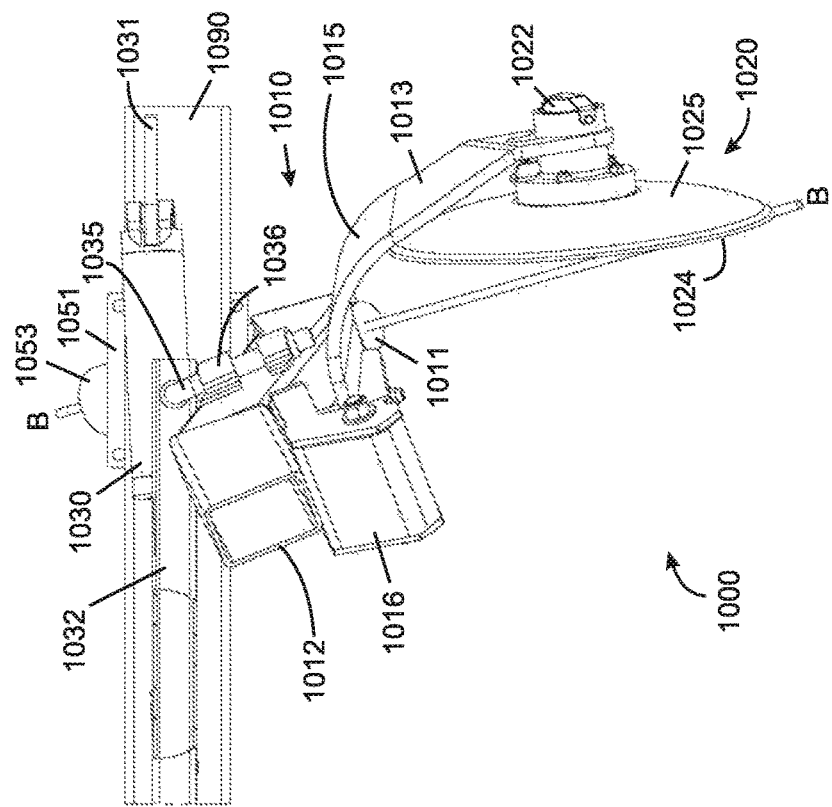

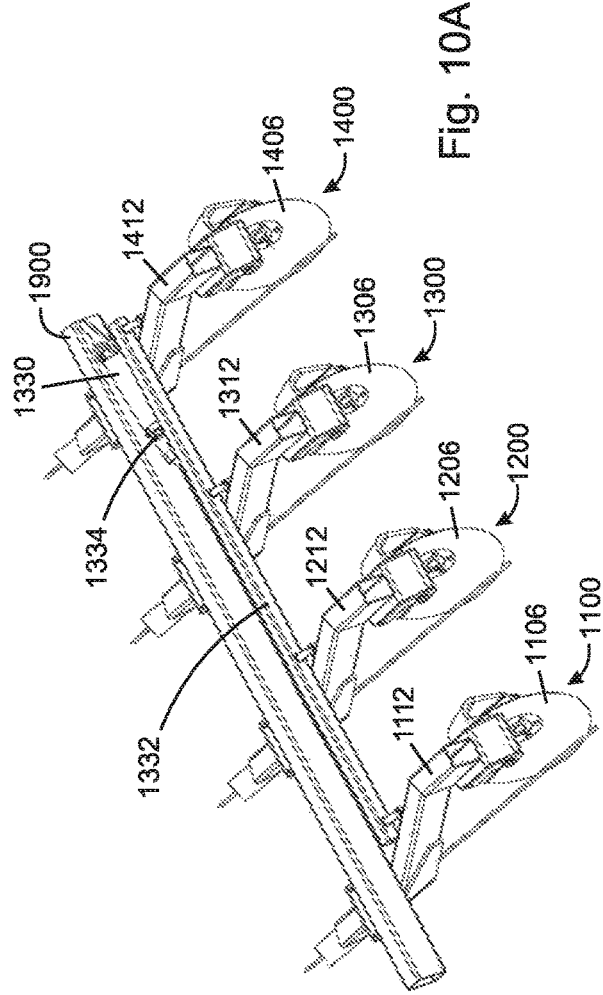
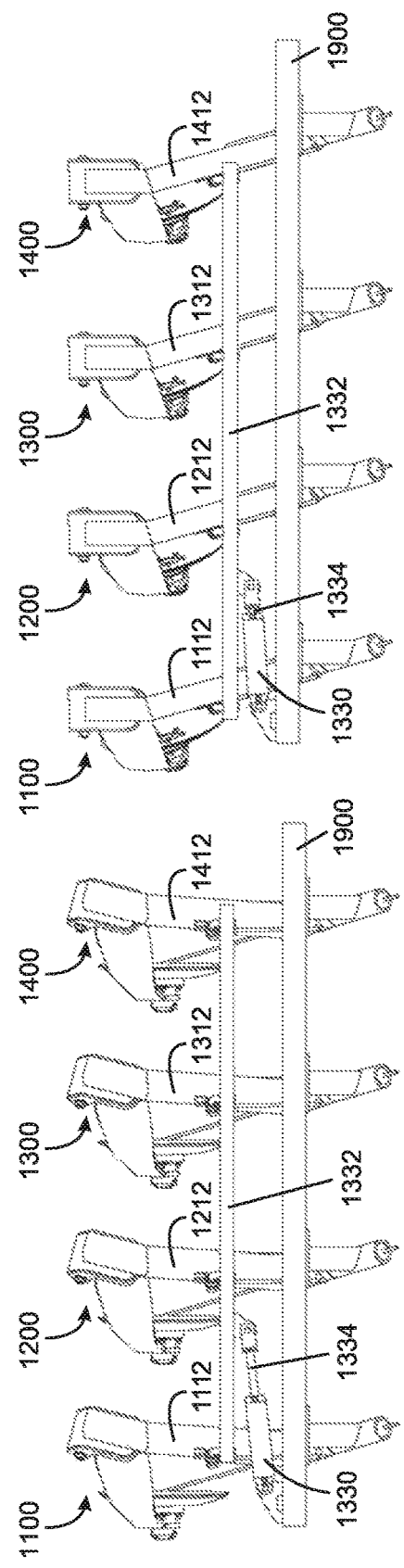

ANGLE ADJUSTABLE COULTER WHEEL ASSEMBLY

CROSS-REFERENCE TO RELATED APPLICATIONS

This application is a continuation of U.S. patent application Ser. No. 15/110,114 filed Jul. 7, 2016, which is a continuation of International Patent Application PCT/CA2015/050013 filed Jan. 9, 2015, which claims the benefit of U.S. patent application 61/925,402 filed Jan. 9, 2014, the entire contents of which are each hereby incorporated by reference.

FIELD

This application relates to farm machinery, in particular to coulter wheel assemblies for tillage apparatuses.

BACKGROUND

Apparatuses, systems and methods for tilling agricultural fields are very well known in the art. Apparatuses typically comprise a cultivator frame having multiple and various tilling attachments attached thereto, laid out on the frame in a variety of patterns to maximize the desired tilling effect. The apparatus is dragged behind a vehicle during the tilling operation.

In particular, conservation tillage, or vertical tillage as it is sometimes called, has recently become a tilling strategy of choice in many instances. Conservation tillage minimally disturbs the soil prior to planting in order to allow air to penetrate the mat of crop residue left in the field from the previous harvest. Apparatuses, systems and methods for conservation tillage are known in the art, for example U.S. Pat. No. 7,762,345 issued Jul. 27, 2010, U.S. Pat. No. 8,113,295 issued Feb. 14, 2012, U.S. Pat. No. 8,196,672 issue Jun. 12, 2012, U.S. Pat. No. 8,307,908 issued Nov. 13, 2012 and U.S. Pat. No. 8,307,909 issued Nov. 13, 2012, the entire contents of all of which are herein incorporated by reference.

A tillage apparatus may comprise various attachments for working a field including, for example, coulter wheels, chisel plows, V-shaped shovels, sub-soiling teeth, leveling attachments and other field working tools. The attachments are typically mounted on longitudinal or transverse frame-members of the cultivator frame either individually or in gangs. Coulter wheels are a particularly useful attachment for conservation tillage techniques. However, coulter wheels are typically mounted on the cultivator frame in a fixed position with no opportunity to adjust the entry angle of the wheel into the soil. This limits the versatility of the coulter wheels to efficiently till different soil types and through different soil conditions. Some attempts have been made to overcome this limitation, for example, the Gates Coulter Disk is a vertical tillage tool that is adjustable from 0 to 15 degrees around a single axis of rotation. While this provides some versatility, the angle adjustment is limited to rotation around a single axis providing limited gains in tilling versatility.

There remains a need in the art for more versatile angle adjustable coulter wheel assemblies.

SUMMARY

There is provided an angle adjustable coulter wheel assembly comprising: a rotatable shank having a longitudinal axis defined by an upper portion of the shank, the longitudinal axis of the upper portion of the shank oriented neither vertically or horizontally with respect to the ground when the assembly is mounted on a tillage apparatus; a coulter wheel rotatably mounted on the shank proximate a lower portion of the shank, the coulter wheel comprising a face and an edge; and, an actuator for rotating the upper portion of the shank about the longitudinal axis, wherein rotation of the shank about the longitudinal axis of the upper portion of the shank causes the face of the coulter wheel to rotate about three orthogonal axes thereby changing orientation of the face of the coulter wheel with respect to the ground when the assembly is mounted on a tillage apparatus.

There is also provided a tillage apparatus comprising a cultivator frame and at least one angle adjustable coulter wheel assembly as described above mounted on the cultivator frame.

There is also provided a method of tilling a field comprising dragging the tillage apparatus as described above across the field with the coulter wheels of the at least one coulter wheel assembly engaged with soil in the field.

The coulter wheel assembly is typically mounted on a cultivator frame of a tillage apparatus. The cultivator frame has a longitudinal axis in the direction of motion of the tillage apparatus as it is being dragged across the ground (e.g. a field). The longitudinal axis of the cultivator frame runs from front to rear (or rear to front) of the frame. The cultivator frame has a transverse axis that is perpendicular to the longitudinal axis of the cultivator frame and runs left to right (or right to left) of the frame. The front end of the frame is mounted to the transportation (e.g. vehicle) that drags the apparatus. The cultivator frame may have having a plurality of longitudinally spaced apart transverse frame members and a plurality of transversely spaced apart longitudinal frame members.

In the angle adjustable coulter wheel assembly, the lower portion of the shank may be transversely offset from the longitudinal axis of the upper portion of the shank. The upper and lower portions of the shank may be in substantially parallel planes or be angled such that a longitudinal axis through the lower portion would cross the longitudinal axis through the upper portion. The upper and lower portions of the shank may be connected such that rotation of the upper portion of the shank causes rotation of the lower portion of the shank. Preferably, the upper portion of the shank is rigidly connected to the lower portion of the shank.

The upper and lower portions of the shank may be connected by an intermediate portion of the shank. The intermediate portion of the shank may form any suitable angles with the upper and lower portion of the shank, the angle between the intermediate portion and upper portion and the angle between the intermediate portion and the lower portion being the same or different. The intermediate portion of the shank may be angled away from the longitudinal axis of the shank.

The shank may comprise a single piece of material, for example a tube or bar, or a plurality of pieces of material connected together. The shank may have at least two spaced-apart elbows along a length of shank. A first elbow may direct the shank away from the longitudinal axis of the upper portion of the shank. A second elbow closer to the lower portion of the shank may direct the shank at least partially back toward the longitudinal axis of the upper portion of the shank but longitudinally away from the upper portion of the shank. The first and second elbows may form substantially 90° angles, although any angles that permit rotation of the shank to usefully orient the face of the coulter wheel are suitable. The shank may have third, fourth or more elbows depending on the most efficient configuration for the coulter wheel assembly.

The coulter wheel assembly may be mounted on the tillage apparatus at any suitable location, for example on a transverse or longitudinal frame member of the cultivator frame. The assembly may be mounted with any suitable mount, for example a bracket, a weld, a bolt, etc. Any part of the assembly may be mounted on the tillage apparatus. Preferably, the upper portion of the shank may be mounted on the tillage apparatus using a shank mount. The shank mount is preferably a bracket that supports the upper portion of the shank while permitting the upper portion of the shank to rotate under the control of the actuator.

The coulter wheel may be any suitable type of coulter wheel, for example rippled, waved, straight or concave coulter wheels, or the coulter wheel may be some other form of disk tool such as a disk harrow. The coulter wheel may comprise a hub rotatably mountable on a shaft, the shaft providing an axle on which the coulter wheel may rotate. The shaft may extend from the lower portion of the shank, preferably toward the longitudinal axis of the upper portion of the shank. At least a majority of the face of the coulter wheel may be between the lower portion of the shank and the longitudinal axis of the upper portion of the shank. Depending on the shape of the coulter wheel and/or the angle that the face of the coulter wheel makes with a horizontal and/or vertical plane, a portion of the face of the coulter wheel may not be between the lower portion of the shank and the longitudinal axis of the upper portion of the shank. The angle of the coulter wheel is adjustable about three orthogonal spatial axes and in at least two planes, a horizontal plane parallel to the ground and defined by the longitudinal and transverse frame members of the cultivator frame and a vertical plane perpendicular to the horizontal plane and containing the longitudinal axis of the cultivator frame. The face of the coulter wheel can form almost any angle with these planes depending on the actuator used to rotate the shank and on any desired constraints placed on the amount of rotation that the upper portion of the shaft may undergo. In an embodiment, the angle that the face of the coulter wheel can make with one or both of the vertical and horizontal planes may be adjustable through an amount up to about 30 degrees, preferably up to about 25 degrees. In an embodiment, horizontal angle range may be from about −5 degrees to about 20 degrees with respect to a normal to the horizontal plane. In an embodiment, vertical angle range may be from about −5 degrees to about 20 degrees with respect to the vertical plane.

In a tillage operation, the coulter wheel contacts soil and rotation of the coulter wheel in the soil permits cutting through residue. When the face of the coulter wheel is in the vertical plane and perpendicular to the horizontal plane, minimum tillage is obtained. As the face of the coulter wheel is rotated away from the vertical plane and away from being perpendicular to the horizontal plane, more tillage action is obtained. However, rotating the face of the coulter wheel can shift the point at which the coulter wheel contacts the soil. In such a case, tillage lines in a field would not be straight if the angle of the face of the coulter wheel was changed during tillage. To ensure that tillage lines remain straight whether or not the angle of the face of the coulter wheel is changed, the coulter wheel assembly may be designed so that a point of first ground contact on the coulter wheel is on the longitudinal axis of the upper portion of the shank. Regardless of the nature of the shank or mounting structures thereon, regardless of the angle of the longitudinal axis, regardless of the angle of the face of the coulter wheel and regardless of the relative orientations of the upper and lower portions of the shank, if the point of first contact of the coulter wheel with the soil is on the longitudinal axis, the point of first contact remains constant and tillage lines will be straight and evenly spaced. This is especially useful for tillage apparatuses in which left hand and right hand concave coulter wheel assemblies are employed. When concave coulter wheels are used, left hand and right hand coulter wheels are needed to balance side forces so that the apparatus pulls straight. Keeping the point of first contact constant for all coulter wheels is therefore important so that the coulter wheels remain evenly spaced and can be uniformly rotated for both the left and right hand assemblies thereby keeping the spacing or line of cut constant in a longitudinal direction of the cultivator.

The actuator may be manual or powered. Manual actuators include, for example, hand cranks, levers, and the like. Powered actuators include, for example, hydraulic, electric or pneumatic actuators. Hydraulic actuators are preferred. The actuator may be controlled locally at the assembly, or remotely. Preferably, the actuator may be controlled remotely, for example from a cab of transportation drawing the tillage apparatus or from a different remote location using wireless connections to control operations of the tillage apparatus. The tillage apparatus may comprise needed electricity supplies, electrical connections, fluid reservoirs, fluid pumps and/or fluid lines to provide for control of the actuator. Preferably, the actuator may be controlled while the tillage apparatus is moving so that the angle of the coulter wheel may be adjusted on the fly.

The actuator may be operatively connected to the shank at any suitable location along the shank, for example the upper portion of the shank or the intermediate portion of the shank. In the case of a hydraulic actuator, extension of an actuator rod may cause rotation of the upper portion of the shank about the longitudinal axis. The rod may be connected to the upper portion of the shank or the intermediate portion of the shank by a linkage arm. The linkage arm may be rigidly connected to the shank and pivotally connected to the actuator rod, or pivotally connected to both the shank and the actuator rod. The actuator may be mounted at any suitable location on the tillage apparatus, for example a transverse or longitudinal frame member of the cultivator frame. The actuator may be mounted on the tillage apparatus using any suitable mount, for example, a bracket, a weld, a bolt, etc.

The angle adjustable coulter wheel assembly may further comprise a safety mechanism for protecting the coulter assembly from being damaged by forces caused when the coulter wheel assembly is deflected by striking a hard and/or immovable object such as a rock. The safety mechanism may comprise one or more resilient elements, for example, resilient blocks, bushings and/or shank portions. A resilient element may comprise any suitable resilient material, for example an elastomer (e.g. rubber) or spring steel. One embodiment of a suitable safety mechanism is described in U.S. Pat. No. 8,365,837 issued Feb. 5, 2013, the entire contents of which is herein incorporated by reference.

The angle adjustable coulter wheel assembly may be used with any tillage apparatus, for example the tillage apparatus described in U.S. Pat. No. 8,307,909 issued Nov. 13, 2012, the entire contents of which is herein incorporated by reference. No-till or conservation tillage apparatuses are preferred. The tillage apparatus may comprise a plurality of coulter wheel assemblies. Coulter wheel assemblies may be mounted individually and/or in gangs. The coulter wheel assemblies in gangs may be individually controlled, for example by employing an actuator with each coulter wheel assembly. Two or more of the coulter wheel assemblies in a gang may be controlled by a single actuator. One actuator may effect rotation of the upper portion of the shanks of at least two coulter wheel assemblies. The coulter wheel assemblies may be mounted on the apparatus in transverse rows, longitudinal rows, randomly or any combination thereof. In one embodiment, the coulter wheel assemblies may be mounted in 1 or more transverse rows, for example 1 or more rows, 2 or more rows, 3 or more rows, 4 or more rows, or 5 or more rows.

When the tillage apparatus is being dragged across a field, the orientation of the face of the coulter wheel with respect to the field may be changed in both a horizontal plane and a vertical plane. This permits the coulter wheel to be more engaged or less engaged with soil in the field depending on soil conditions. The ability to change the orientation of the coulter wheel while the tillage apparatus is moving is particularly useful. Thus, the coulter wheel assembly permits adjusting the angle of the coulter wheel in at least two planes permitting greater control over how much soil the coulter wheel disturbs during tilling.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 2A depicts a top view of the coulter wheel assembly of FIG. 1 with the coulter wheel angled in a first position;

FIG. 2B depicts a top view of the coulter wheel assembly of FIG. 1 with the coulter wheel angled in a second position;

FIG. 5A depicts a perspective view of a gang comprising three coulter wheel assemblies of FIG. 1;

FIG. 5B depicts a top view of the gang of coulter wheel assemblies of FIG. 5A with the coulter wheels angled in a first position;

FIG. 5C depicts a top view of the gang of coulter wheel assemblies of FIG. 5A with the coulter wheels angled in a second position;

FIG. 8A depicts front view of the coulter wheel assembly of FIG. 7A;

FIG. 8B depicts front view of the coulter wheel assembly of FIG. 7B;

FIG. 10A depicts a perspective view of a gang comprising four coulter wheel assemblies of FIG. 6;

FIG. 10B depicts a top view of the gang of coulter wheel assemblies of FIG. 10A with the coulter wheels angled in a first position;

FIG. 10C depicts a top view of the gang of coulter wheel assemblies of FIG. 10A with the coulter wheels angled in a second position;

DETAILED DESCRIPTION

Figure 1:
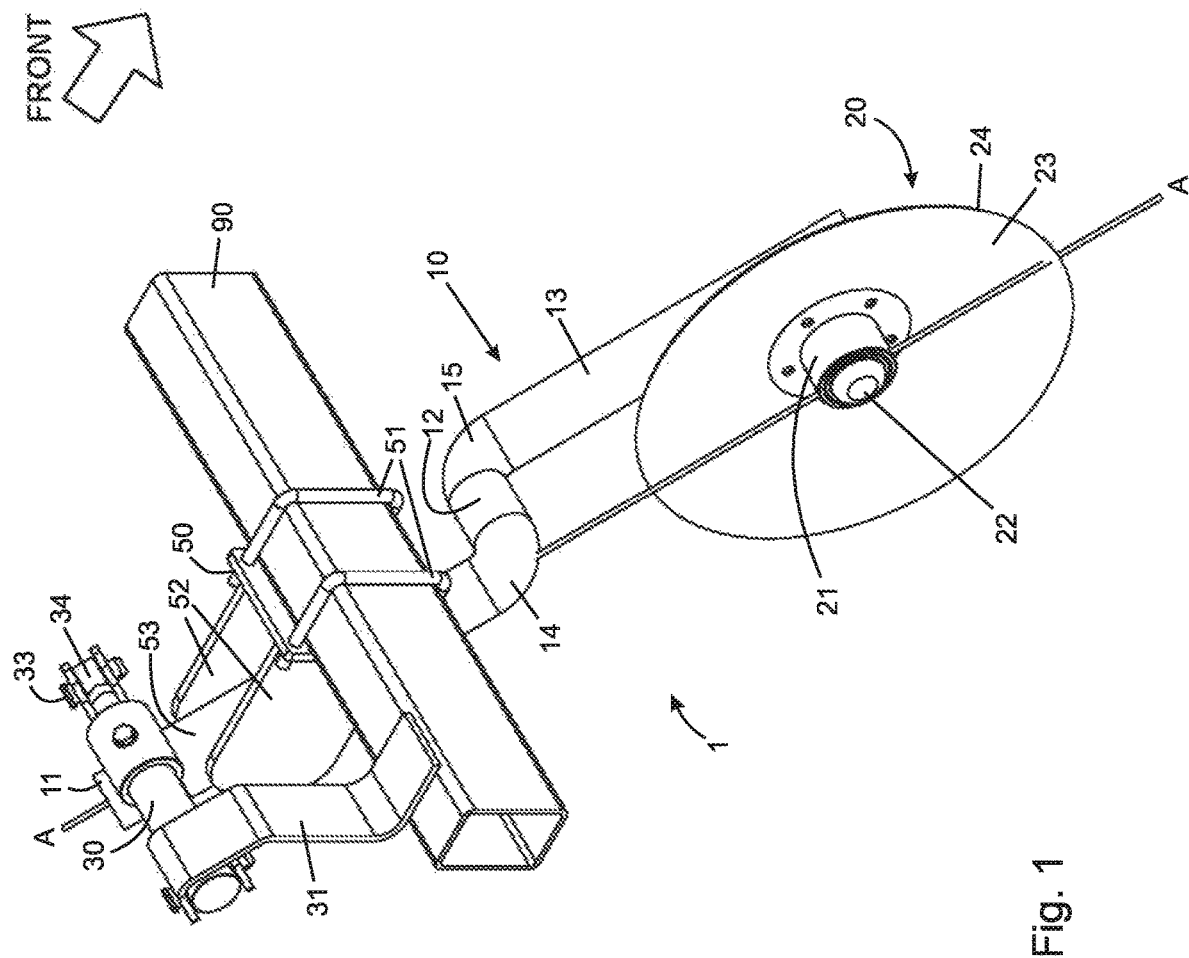
FIG. 1 depicts a perspective view of one embodiment of an angle adjustable coulter wheel assembly.
Figure 3A:
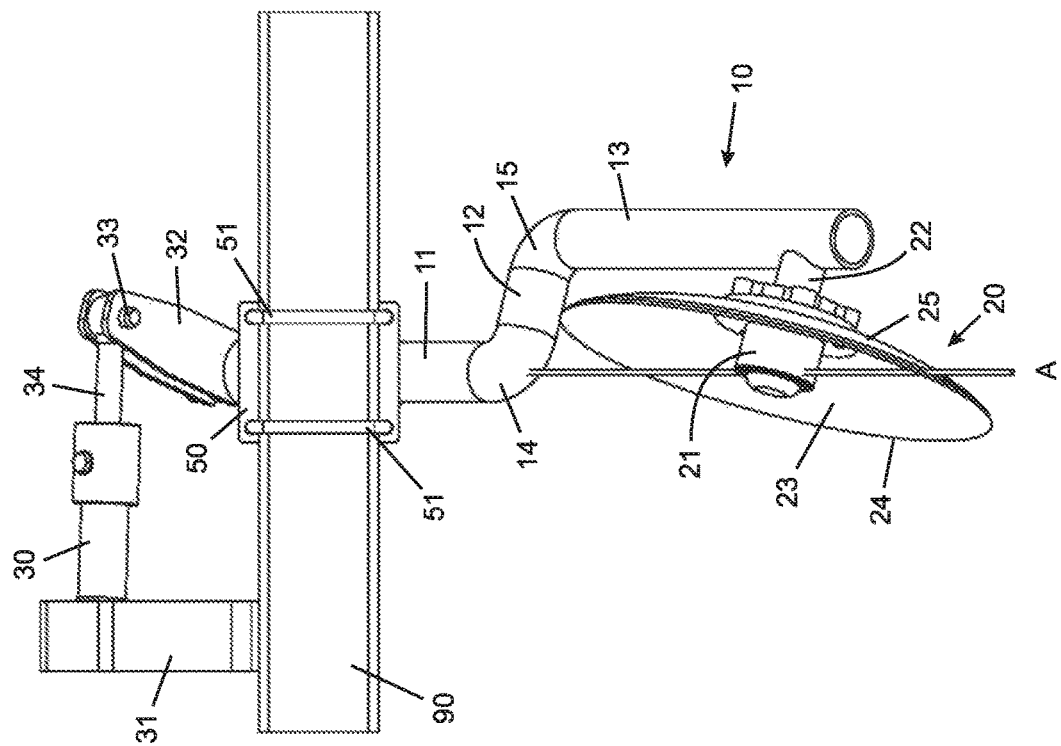
FIG. 3A depicts front view of the coulter wheel assembly of FIG. 2A.
Figure 3B:
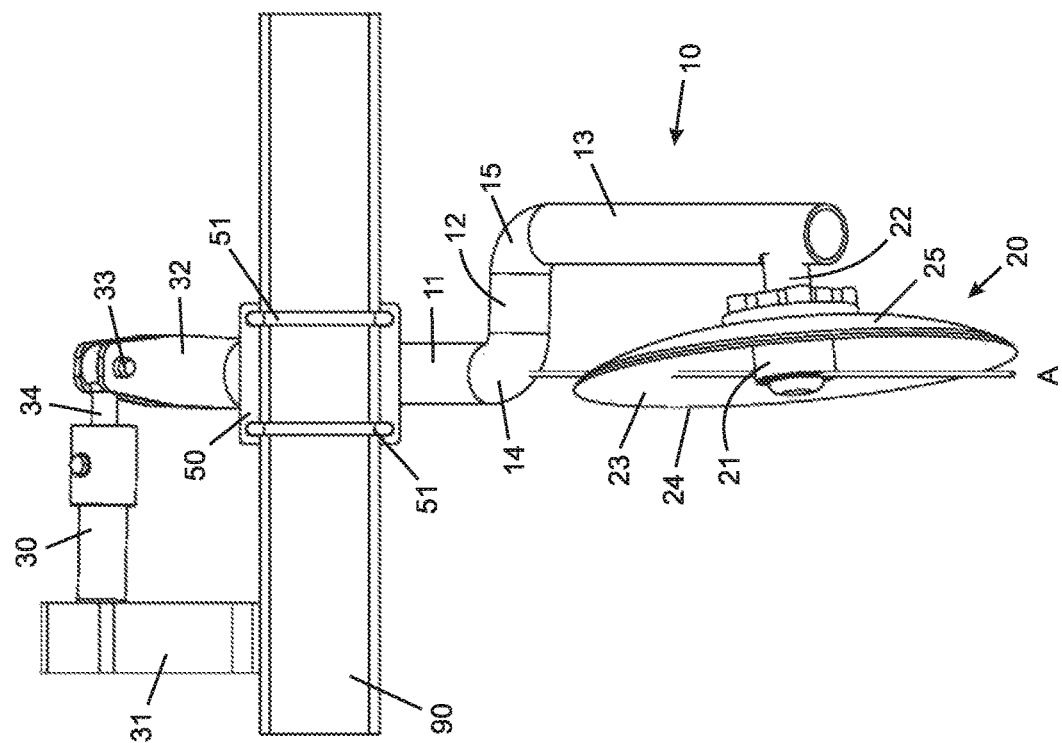
FIG. 3B depicts front view of the coulter wheel assembly of FIG. 2B.
Figure 4B:
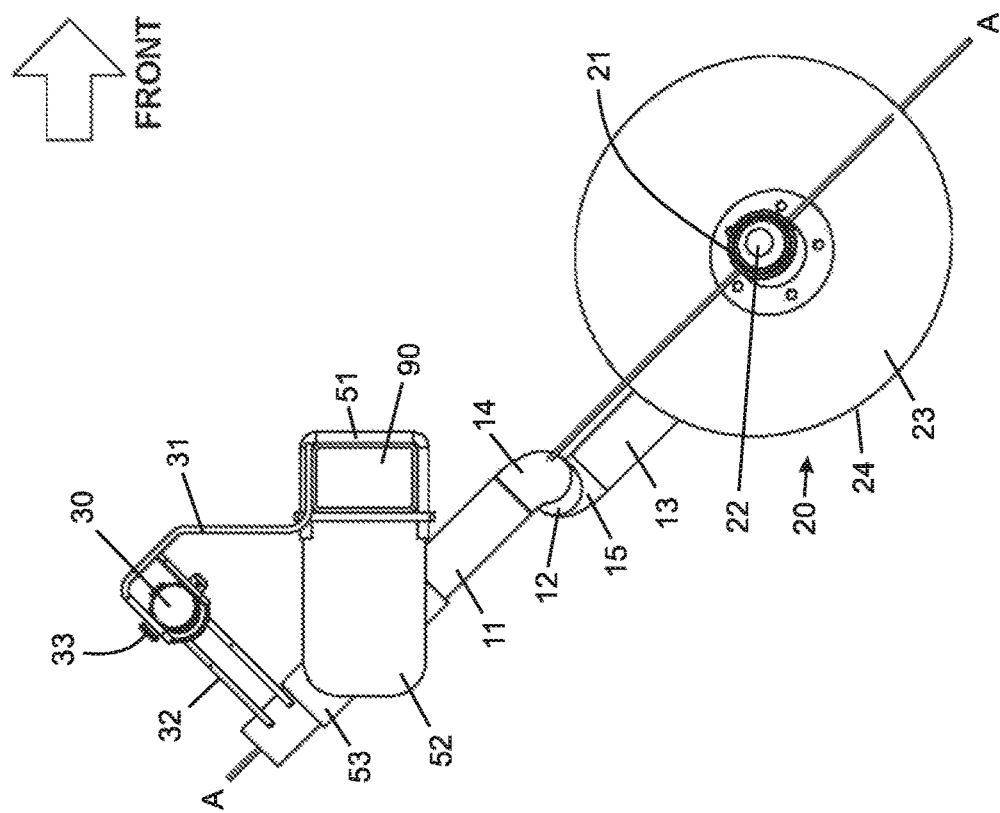
FIG. 4B depicts side view of the coulter wheel assembly of FIG. 2B.
Figure 4A:
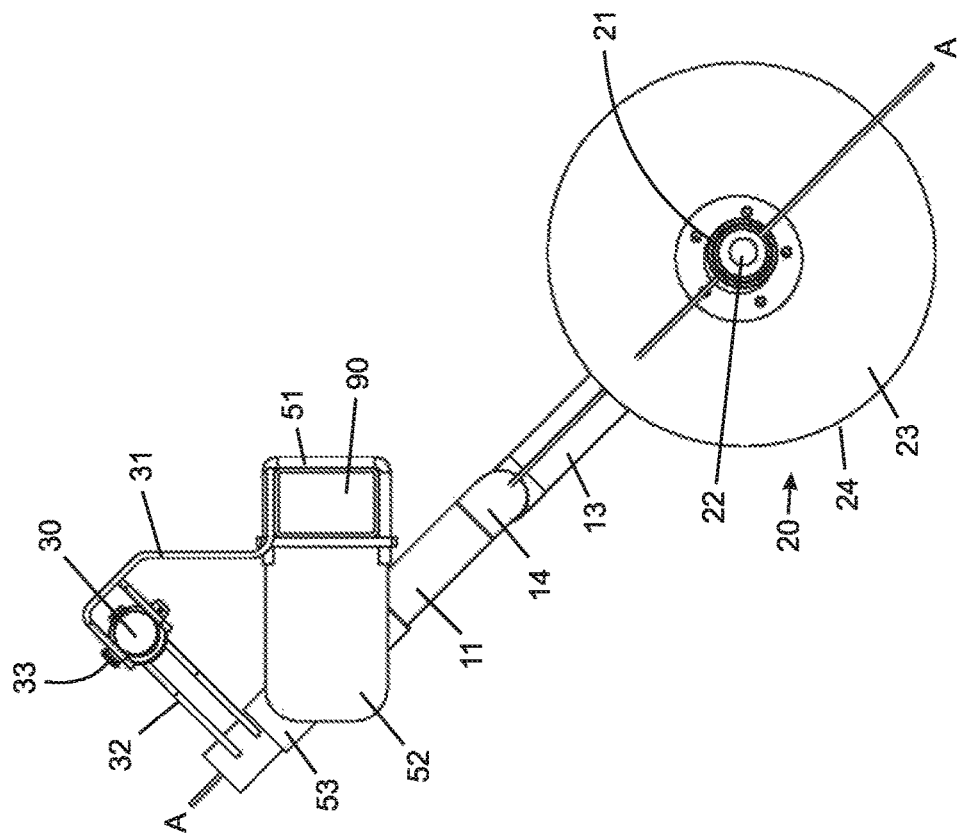
FIG. 4A depicts side view of the coulter wheel assembly of FIG. 2A.

Referring to FIG. 1, FIG. 2A, FIG. 2B, FIG. 3A, FIG. 3B, FIG. 4A and FIG. 4B, one embodiment of a coulter wheel assembly 1 is shown comprising a shank 10 having an upper shank section 11 mounted on a transverse frame element 90 of a cultivator frame with a mounting bracket 50. The mounting bracket 50 may comprise any suitable structures to engage the transverse frame element 90 and shank 10, for example U-bolts 51 to secure the mounting bracket 50 to the transverse frame element 90 and spaced-apart bracket arms 52 with a receiving tube 53 secured there between (as best seen in FIG. 4A and FIG. 4B) within which the upper shank section 11 of the shank 10 is supported. The upper shank section 11 is free to rotate within the receiving tube 53 and the receiving tube 53 may be secured between the spaced-apart bracket arms 52 by any suitable method, preferably by welding. The arrows labeled "FRONT" in FIG. 1, FIG. 2A,B and FIG. 4A,B indicate the direction of the front of the cultivator frame, i.e. the direction of movement of the cultivator frame when the tillage apparatus is being dragged across a field.

The coulter wheel assembly 1 further comprises a coulter wheel 20 having a hub 21 rotatably mounted on an axle 22 extending from a lower shank section 13 of the shank 10. The coulter wheel may be any type of coulter wheel, for example rippled, waved, straight or concave coulter wheels, or the coulter wheel may be some other form of disk tool such as a disk harrow. The coulter wheel 20 is depicted as a concave coulter wheel. The upper shank section 11 is connected to the lower shank section 13 by a middle shank section 12 that forms a double elbow 14, 15 between the upper and lower shank sections 11, 13, respectively, so that the upper and lower shank sections 11, 13 are transversely offset. It is evident to one skilled in the art that the lower shank section 13 may be substantially parallel to the upper shank section 11 but does not need to be, and that each of the elbows may be any suitable angle to provide the desired orientation of the lower shank section 13 in relation to the upper shank section 11.

The shank 10 is oriented to generally point downward and to a front of the cultivator frame. Thus, the orientation of the shank 10 is generally perpendicular to the transverse frame element 90 but is not orthogonal to or parallel with the longitudinal axis of the cultivator frame. Thus, longitudinal axis A of the upper shank section 11 is also not orthogonal to or parallel with the longitudinal axis of the cultivator frame, but is perpendicular to the transverse frame element 90. The lower shank section 13 is thus transversely offset from the longitudinal axis A of the upper shank section 11. The longitudinal axis A of the upper shank section 11 preferably forms an angle in a range of from about 30 degrees to about 60 degrees with the longitudinal axis of the cultivator frame.

To be able to rotate the shank 10, a hydraulic cylinder 30 mounted on the transverse frame element 90 is linked to the upper shank section 11 of the shank 10. The hydraulic cylinder 30 is rigidly mounted on the transverse frame element 90 by mounting flange 31. A cylinder rod 34 of the hydraulic cylinder 30 is pivotally linked to a rotatable arm 32 by pivot pin 33 and the rotatable arm 32 is secured, for example by welding, to the upper shank section 11. In the embodiment shown in the Figures, the rotatable linkage arm 32 may comprises two spaced-apart parallel arm portions where both arm portions are secured to the upper shank section 11 for greater security. The hydraulic cylinder may be powered by a hydraulic fluid pump hydraulically connected to the cylinder by fluid lines. Hydraulic connections for tillage implements are well known in the art. Although a hydraulic cylinder is particularly exemplified, it is evident that any form of actuator may be employed, for example manual actuators such as hand cranks, or other powered actuators such as electric or pneumatic actuators.

The coulter wheel 20 has two opposed faces 23, 25 and an edge 24. When the rod 34 of the hydraulic cylinder 30 is fully retracted as shown in FIG. 2A, FIG. 3A and FIG. 4A, the coulter wheel 20 is in a first orientation whereby the faces 23, 25 are substantially oriented in a first plane having a first angular relationship to a horizontal plane defined by the longitudinal and transverse frame elements of the cultivator frame and a vertical longitudinal plane perpendicular to the horizontal plane. When the rod 34 of the hydraulic cylinder 30 extends, the rotatable arm 32 at the pivot pin 33 begins to translate through an arcuate path about the longitudinal axis A of the upper shank section 11. Because the rotatable arm 32 is secured to the upper shank section 11, arcuate movement of the rotatable arm 32 causes the upper shank section 11 to rotate about the longitudinal axis A. This rotation is counterclockwise as depicted in FIG. 2B, FIG. 3B and FIG. 4B but the direction of rotation depends on viewer perspective and on which side of the coulter wheel assembly the hydraulic cylinder is mounted. Rotation of the upper shank section 11 causes the lower shank section 13 to move. Because the lower shank section 13 is transversely offset in relation to the upper shank section 11 and because the middle shank section 12 connecting the lower shank section 13 to the upper shank section 11 provides for elbows that change the angular orientation of the shank 10 at intervals along the length of the shank 10, the simple rotational movement of the upper shank section 11 around one axis (i.e. the longitudinal axis A) translates into a more complicated movement of the lower shank section 13 around three orthogonal spatial axes. The movement of the lower shank section 11 translates to a movement of the coulter wheel 20 around the three orthogonal spatial axes as well, such that the coulter wheel 20 comes to occupy a second orientation as shown in FIG. 2B, FIG. 3B and FIG. 4B whereby the faces 23, 25 are substantially oriented in a second plane having a second angular relationship to the horizontal plane defined by the longitudinal and transverse frame elements of the cultivator frame and the vertical longitudinal plane perpendicular to the horizontal plane. The second orientation of the coulter wheel is angularly different about the three orthogonal spatial axes than the first orientation, thus the coulter wheel 20 has rotated about three axes instead of one axis. Therefore, the faces 23, 25 of the coulter wheel 20 have rotated in both the horizontal and vertical planes. Retraction of the cylinder rod 34 reverses the motions and ultimately returns the coulter wheel 20 to the first orientation.

The coulter wheel 20 is therefore adjustable in two planes and three axes and can engage soil in various ways depending on the extent of rotation of the upper shank section 11, which in turn depends on how far the cylinder rod 34 extends. It is evident that with appropriate choice of actuator and appropriate design of how the actuator is coupled to the shank, the upper shank section can be made to rotate through any angle thereby providing great flexibility and variation in the orientation of the coulter wheel. Preferably, the orientation of the coulter wheel is adjustable through a range of angles from about −5 degrees to about 20 degrees with respect to a normal to the horizontal plane and from about −5 degrees to about 20 degrees with respect to the vertical plane.

While a variety of actuators may be employed, the use of powered actuators permits an operator to change coulter wheel orientation on the fly. For example, with a hydraulic cylinder actuator, an operator in a cab of the transportation can set the coulter wheel orientation as desired to match upcoming soil conditions without the need to stop the tillage apparatus. When minimal soil disturbance is desired, the coulter wheel may be oriented straighter and more vertically as depicted in FIG. 2A, FIG. 3A and FIG. 4A. When greater soil disturbance is desired, the coulter wheel may be angled more out of the horizontal and vertical planes as depicted in FIG. 2B, FIG. 3B and FIG. 4B. The orientation of the coulter wheels may be customized to meet specific needs.

Coulter wheel assemblies may be mounted on a transverse frame element in gangs. Each coulter wheel assembly in the gang may be individually controlled, for example each having its own actuator. Individual control of the coulter wheel assemblies permits orienting each coulter wheel differently if desired.

If there is no need or desire to provide individually controlled coulter wheel assemblies, two or more of the coulter wheel assemblies may share an actuator so that the two or more assemblies are controllable simultaneously in the same manner. In one embodiment referring to FIG. 5A, FIG. 5B and FIG. 5C, a gang of three coulter wheel assemblies 100, 110, 120 are shown mounted on a single transverse frame element 900. The coulter wheel assemblies 100, 110, 120 are the same and are the same design as the one depicted in FIG. 1. A cylinder rod 334 of a single hydraulic cylinder 300 is pivotally linked to a rotatable arm 102 of the coulter wheel assembly 100 and rotatable arms 102, 112, 122 of the three coulter wheel assemblies 100, 110, 120, respectively, are linked together by a linkage bar 350. Linear movement of the cylinder rod 334 causes pivoting of the rotatable arm 102, which in turn causes linear translation of the linkage bar 350. Linear translation of the linkage bar 350 causes pivoting of the rotatable arms 112, 122 by the same amount and in the same direction as the pivoting of the rotatable arm 102. As previously described, rotation of the rotatable arms 102, 112, 122 ultimately causes coulter wheels 106, 116, 126, respectively, to change orientations. The three coulter wheels in the gang have the same orientation with respect to each other.

Referring to FIG. 6, FIG. 7A, FIG. 7B, FIG. 8A, FIG. 8B, FIG. 9A and FIG. 9B, another embodiment of a coulter wheel assembly 1000 is shown comprising a shank 1010 having an upper shank section 1011 mounted on a transverse frame element 1090 of a cultivator frame with a mounting bracket 1050. The mounting bracket 1050 may comprise any suitable structures to engage the transverse frame element 1090 and shank 1010, for example mounting plate 1051 to secure bracket arm 1052 to the transverse frame element 1090 with a receiving tube 1053 secured to the bracket arm 1052. The upper shank section 1011 of the shank 1010 is supported within the receiving tube 1053. The upper shank section 1011 is free to rotate within the receiving tube 1053 and the receiving tube 1053 may be secured to the bracket arm 1052 by any suitable method, preferably by welding. The arrows labeled "FRONT" in FIG. 6, FIG. 7A,B and FIG. 9A,B indicate the direction of the front of the cultivator frame, i.e. the direction of movement of the cultivator frame when the tillage apparatus is being dragged across a field.

The coulter wheel assembly 1000 further comprises a coulter wheel 1020 having a rim 1021 rotatably mounted on an axle 1022 extending from a lower shank section 1013 of the shank 1010. The coulter wheel may be any type of coulter wheel, for example rippled, waved, straight or concave coulter wheels, or the coulter wheel may be some other form of disk tool such as a disk harrow. The coulter wheel 1020 is depicted as a concave coulter wheel. The upper shank section 1011 is connected to the lower shank section 1013 by a middle shank section 1012. While the upper shank section 1011 is a cylindrical bar, the middle shank section 1012 is a rectangular tube connected to the upper shank section 1011 by a pair of elbow brackets 1014. The lower shank section 1013 is a flat bent bar connected to the middle shank section 1014 by an elbow 1015 attached through a pivot pin 1041 to a lower shank mount 1016 proximate an end of the middle shank section 1012. The upper shank section 1011 and a lower end of the lower shank section 1013 are transversely offset from each other.

The lower shank section 1013 and/or the elbow 1015 may be at least partially made of spring steel. The lower shank mount 1016 comprises the pivot pin 1041 mounted thereto with a resilient bushing (not shown) mounted thereon, which may be able to deform upon lateral deflection of the lower shank section 1013 thereby absorbing some of the load that would otherwise be transferred to the pivot pin 1041. The bushing may be pre-compressed and/or may be provided with a clockwise or counter-clockwise bias to aid in resisting pivoting movement of the pivot pin 1041. The bushing may provide the added benefit of reducing wear caused by ingress of dirt to the pivot pin 1041. However, in the present application, the resilient bushing may be of limited use as it may become virtually non-compressible due to side load forces. A resilient block 1043 may also be provided between an upper mounting portion of the lower shank mount 1016 and the elbow 1015, which provides further absorption of loads caused when the coulter wheel assembly 1000 is deflected. By providing the lower shank section 1013 and/or the elbow 1015 with at least a resilient portion and also by providing the resilient block 1043, the coulter wheel assembly 1000 is able to absorb lateral deflection due to impact with obstacles (e.g. rocks) and also rearward vertical deflection, thereby mitigating impact damage to the coulter wheel assembly 1000 regardless of the angle at which the obstacle is struck. This permits higher speeds to be used without excessive breakage.

The shank 1010 is oriented to generally point downward and to a front of the cultivator frame. Thus, the orientation of the shank 1010 is generally perpendicular to the transverse frame element 1090 but is not orthogonal to or parallel with the longitudinal axis of the cultivator frame. Thus, longitudinal axis B of the upper shank section 1011 is also not orthogonal to or parallel with the longitudinal axis of the cultivator frame, but is perpendicular to the transverse frame element 1090. The lower shank section 1013 is thus transversely offset from the longitudinal axis B of the upper shank section 1011. The longitudinal axis B of the upper shank section 1011 preferably forms an angle in a range of from about 30 degrees to about 60 degrees with the longitudinal axis of the cultivator frame.

Figure 7A:
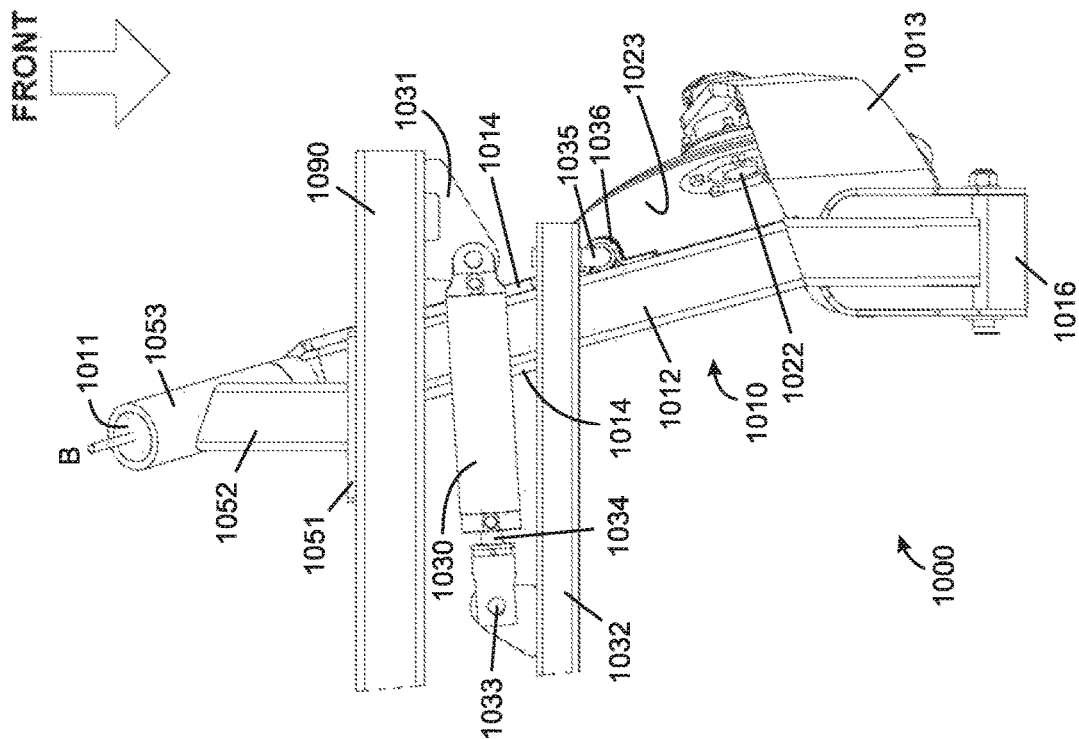
FIG. 7A depicts a top view of the coulter wheel assembly of FIG. 6 with the coulter wheel angled in a first position.
Figure 7B:
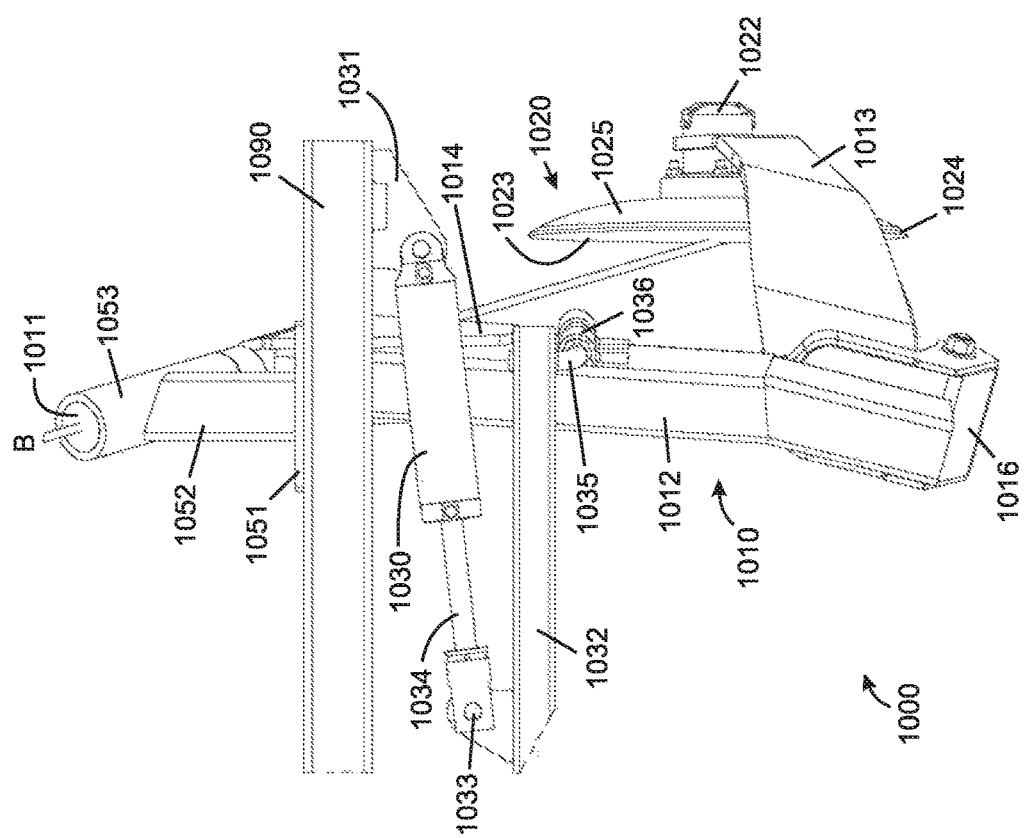
FIG. 7B depicts a top view of the coulter wheel assembly of FIG. 6 with the coulter wheel angled in a second position.

To be able to rotate the shank 1010, a hydraulic cylinder 1030 pivotally mounted on the transverse frame element 1090 is linked to the middle shank section 1012 of the shank 1010. The hydraulic cylinder 1030 is pivotally mounted on the transverse frame element 1090 by mounting flange 1031. A cylinder rod 1034 of the hydraulic cylinder 1030 is pivotally linked to a control arm 1032 by pivot 1033 and the control arm 1032 is pivotally secured to the middle shank section 1012 by a pin 1035 journaled in a sleeve 1036. As best seen in FIG. 7A and FIG. 7B, extension or retraction of the cylinder rod 1034 causes the control arm 1032 to translate transversely thereby causing the middle shank section 1012 to translate transversely through an arcuate path about the longitudinal axis B of the upper shank section 1011. The upper shank section 1011 therefore rotates about the longitudinal axis B and, as described in more detail below, the orientation of the coulter wheel 1020 is thereby made to change. The hydraulic cylinder may be powered by a hydraulic fluid pump hydraulically connected to the cylinder by fluid lines. Hydraulic connections for tillage implements are well known in the art. Although a hydraulic cylinder is particularly exemplified, it is evident that any form of actuator may be employed, for example manual actuators such as hand cranks, or other powered actuators such as electric or pneumatic actuators.

Figure 9A:
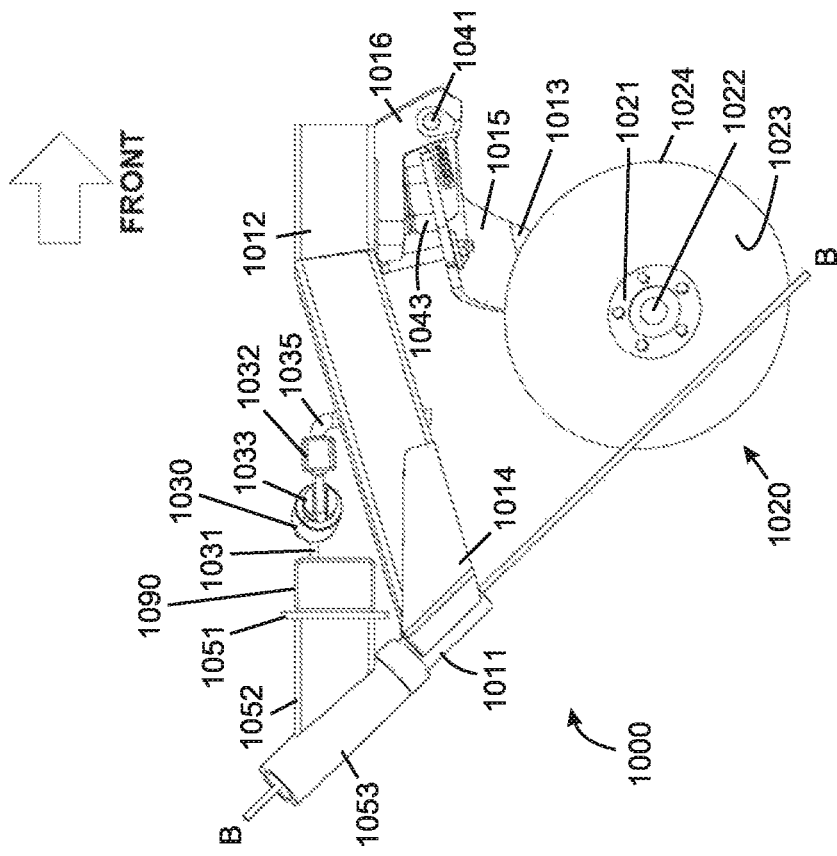
FIG. 9A depicts side view of the coulter wheel assembly of FIG. 7A.
Figure 9B:
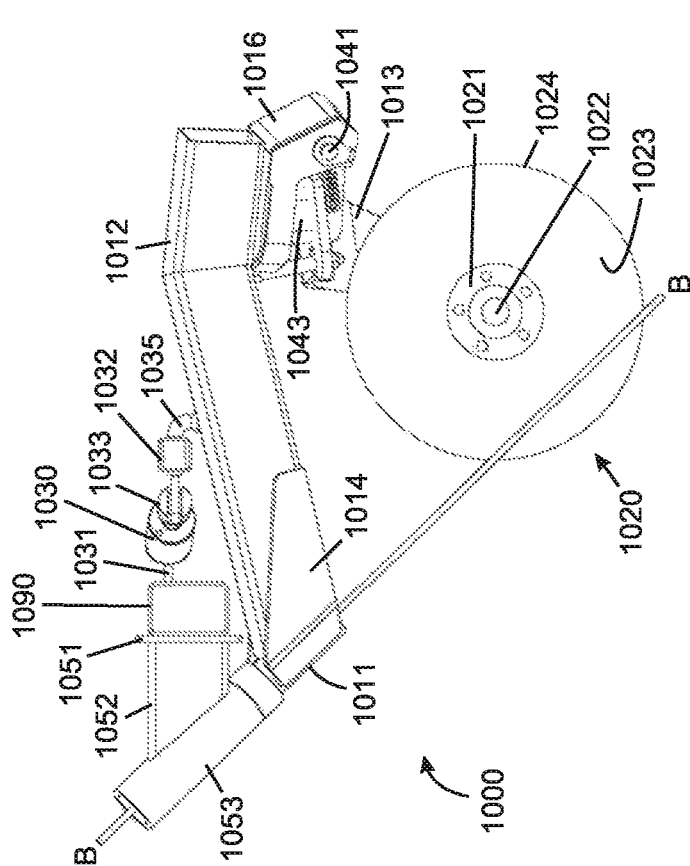
FIG. 9B depicts side view of the coulter wheel assembly of FIG. 7B.

The coulter wheel 1020 has two opposed faces 1023, 1025 and an edge 1024. When the rod 1034 of the hydraulic cylinder 1030 is fully extended as shown in FIG. 7A, FIG. 8A and FIG. 9A, the coulter wheel 1020 is in a first orientation whereby the faces 1023, 1025 are substantially oriented in a first plane having a first angular relationship to a horizontal plane defined by the longitudinal and transverse frame elements of the cultivator frame and a vertical longitudinal plane perpendicular to the horizontal plane. When the rod 1034 of the hydraulic cylinder 1030 retracts, the control arm 1032 begins to translate transversely. Transverse translation of the control arm 1030 causes the middle shank section 1012 to translate in the same direction, but because the middle shank section 1012 is connected to the upper shank section 1011, the middle shank section 1012 follows and arcuate path with the upper shank section 1011 rotating about the longitudinal axis B. The pin 1035 rotatatable in the sleeve 1036 to prevent binding as the middle shank section 1012 translates arcuately while the control arm 1032 translates linearly. Rotation of the upper shank section 1011 causes the lower shank section 1013 to move. Because the lower shank section 1013 is transversely offset in relation to the upper shank section 1011 and because the middle shank section 1012 connecting the lower shank section 1013 to the upper shank section 1011 provides for bends that change the angular orientation of the shank 1010 at intervals along the length of the shank 1010, the simple rotational movement of the upper shank section 1011 around one axis (i.e. the longitudinal axis B) translates into a more complicated movement of the lower shank section 1013 around three orthogonal spatial axes. The movement of the lower shank section 1011 translates to a movement of the coulter wheel 1020 around the three orthogonal spatial axes as well, such that the coulter wheel 1020 comes to occupy a second orientation as shown in FIG. 7B, FIG. 8B and FIG. 9B whereby the faces 1023, 1025 are substantially oriented in a second plane having a second angular relationship to the horizontal plane defined by the longitudinal and transverse frame elements of the cultivator frame and the vertical longitudinal plane perpendicular to the horizontal plane. The second orientation of the coulter wheel is angularly different about the three orthogonal spatial axes than the first orientation, thus the coulter wheel 1020 has rotated about three axes instead of one axis. Therefore, the faces 1023, 1025 of the coulter wheel 1020 have rotated in both the horizontal and vertical planes. Extension of the cylinder rod 1034 reverses the motions and ultimately returns the coulter wheel 1020 to the first orientation.

The coulter wheel 1020 is therefore adjustable in two planes and three axes and can engage soil in various ways depending on the extent of rotation of the upper shank section 1011, which in turn depends on how far the cylinder rod 1034 retracts. It is evident that with appropriate choice of actuator and appropriate design of how the actuator is coupled to the shank, the upper shank section can be made to rotate through any angle thereby providing great flexibility and variation in the orientation of the coulter wheel. Preferably, the orientation of the coulter wheel is adjustable through a range of angles from about −5 degrees to about 20 degrees with respect to a normal to the horizontal plane and from about −5 degrees to about 20 degrees with respect to the vertical plane.

Figure 6:
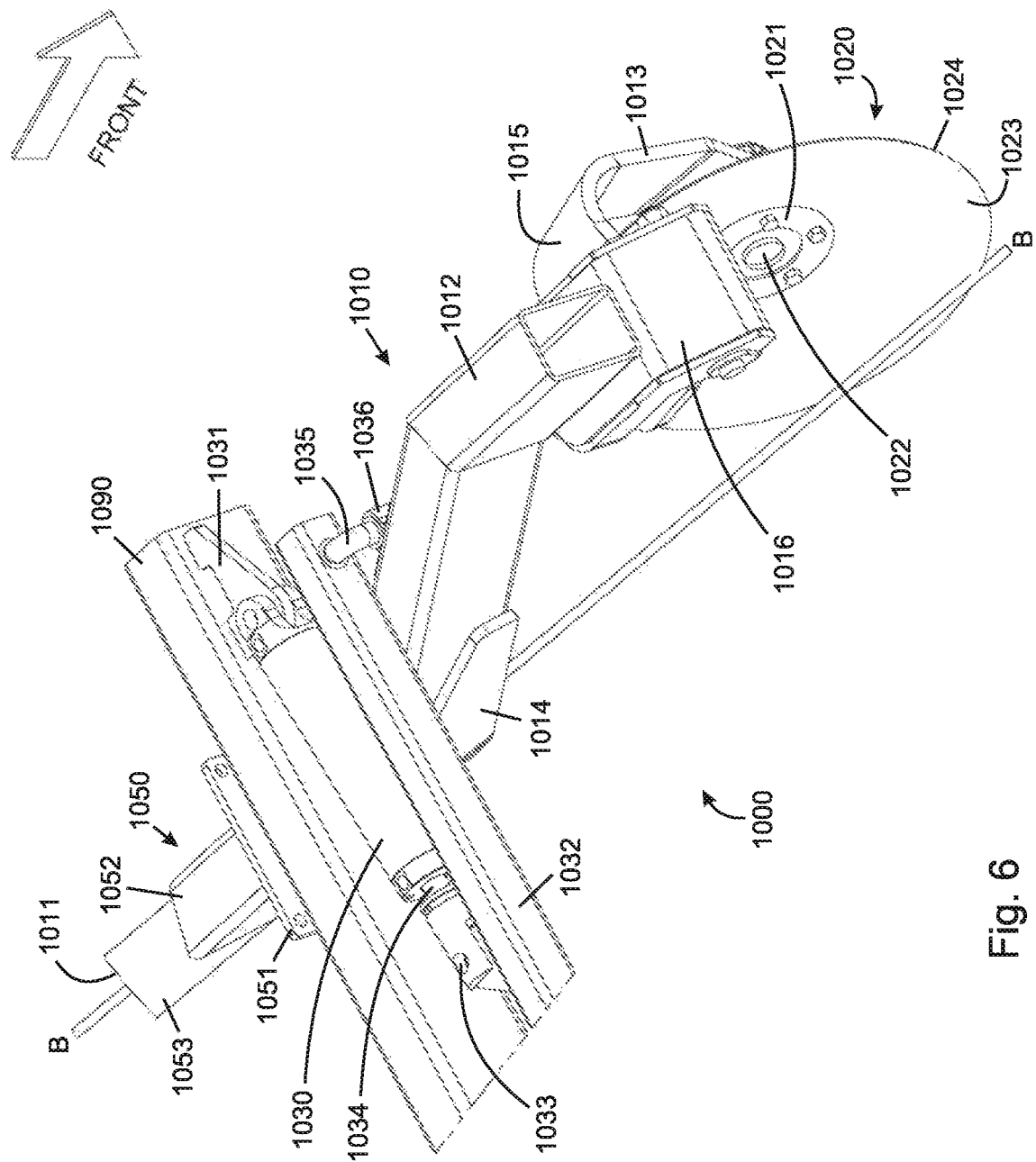
FIG. 6 depicts a perspective view of another embodiment of an angle adjustable coulter wheel assembly.
Figure 11C:
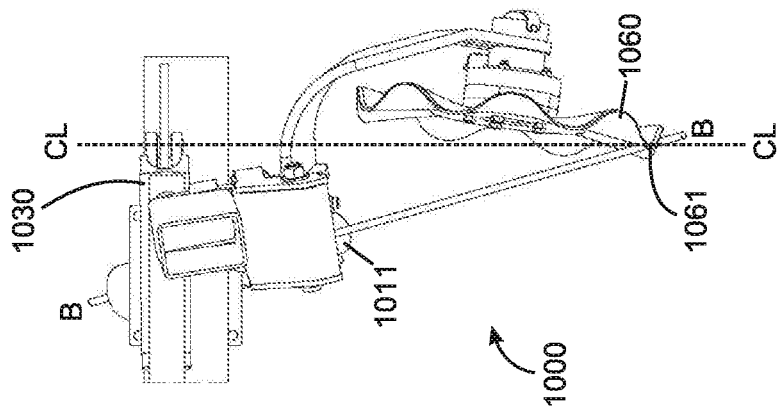
FIG. 11C depicts a front view of the coulter wheel assembly of FIG. 6 with a wavy coulter wheel instead of a concave coulter wheel and with the coulter wheel angled in a second position; and, FIG. 12 depicts an enlarged view of an underside of a lower shank portion of a coulter wheel assembly without a coulter wheel.
Figure 11B:
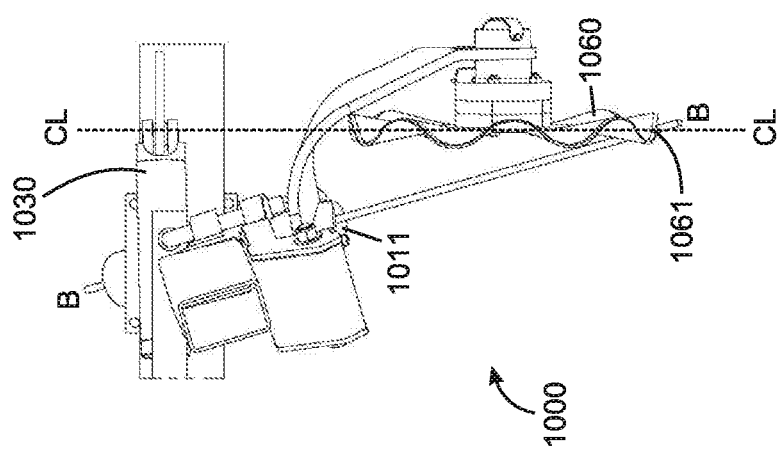
FIG. 11B depicts a front view of the coulter wheel assembly of FIG. 6 with a wavy coulter wheel instead of a concave coulter wheel and with the coulter wheel in a straight-up position.
Figure 11A:
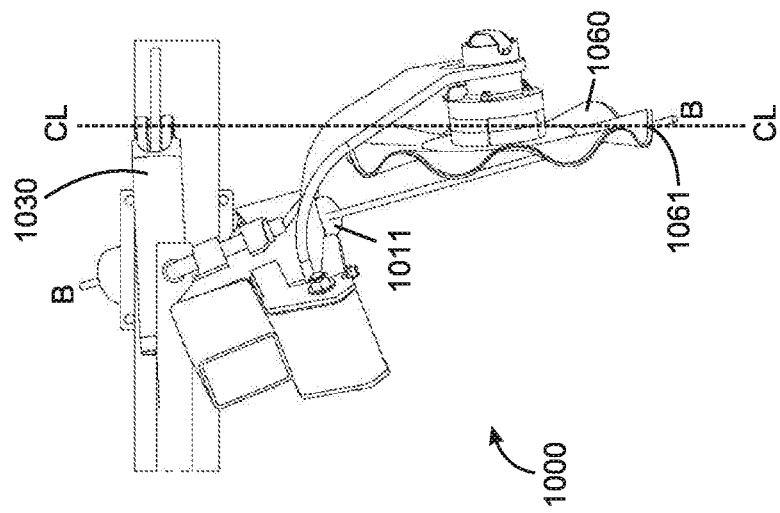
FIG. 11A depicts a front view of the coulter wheel assembly of FIG. 6 with a wavy coulter wheel instead of a concave coulter wheel and with the coulter wheel angled in a first position.

Referring to FIG. 11A, FIG. 11B and FIG. 11C, the coulter wheel assembly 1000 of FIG. 6 is shown except the concave coulter wheel is replaced with a waved coulter wheel 1060, which allows for less aggressive tillage through the range of angles than a concave coulter wheel. The coulter wheel assembly 1000 of FIG. 11A, FIG. 11B and FIG. 11C otherwise functions in the same manner as the coulter wheel assembly of FIG. 6. FIG. 11A, FIG. 11B and FIG. 11C further illustrate a range of angle adjustability for the coulter wheel assembly 1000. Centerline axis CL is a vertical axis in the vertical plane, the centerline axis CL passing through a contact point 1061 where the coulter wheel 1060 contacts the soil. FIG. 11A illustrates the coulter wheel 1060 tipped in one horizontal direction away from the vertical plane (and also tipped in one vertical direction away from a normal to the horizontal plane) so that a face of the coulter wheel 1060 forms an angle of about −5 degrees with respect to the vertical plane. As illustrated in FIG. 11B, rotation of the upper shank 1011 about the longitudinal axis B causes the coulter wheel 1060 to assume a straight-up position in which the face of the coulter wheel 1060 forms an angle of about 0 degrees with respect to the vertical plane and about 0 degrees with respect to a normal to the horizontal plane (i.e. about 90 degrees with respect to the horizontal plane). As illustrated in FIG. 11C, further rotation of the upper shank 1011 about the longitudinal axis B causes the coulter wheel 1060 to assume a second position where the coulter wheel 1060 is tipped in the other horizontal direction away from the vertical plane (and also tipped in the other vertical direction away from a normal to the horizontal plane) so that the face of the coulter wheel 1060 forms an angle of about 20 degrees with respect to the vertical plane. As is evident, the face of the coulter wheel 1060 can assume any angle with respect to the vertical plane between the first and second positions. This permits sensitive control over how much contact the face of the coulter wheel 1060 has with the soil, thereby controlling the amount of tillage that may be accomplished, which is especially important when the coulter wheel is concave.

Comparing FIG. 11A, FIG. 11B and FIG. 11C, it is apparent that the contact point 1061 on the coulter wheel 1060 does not change position regardless of the angle of the coulter wheel 1060 or the angle of the longitudinal axis B. The longitudinal axis B of the upper shank 1011 meets the contact point 1061 on the coulter wheel 1060 so that when the hydraulic cylinder 1030 rotates the coulter assembly 1000 by rotating the upper shank 1011 the contact point 1061 remains at a constant position. Thus, the coulter wheel 1060 can uniformly rotate whether left or right handed assemblies are used, and spacing or line of cut in the longitudinal direction of the cultivator will remain straight. This permits a range of minimum tillage to maximum tillage action in one tillage apparatus.

Figure 12:
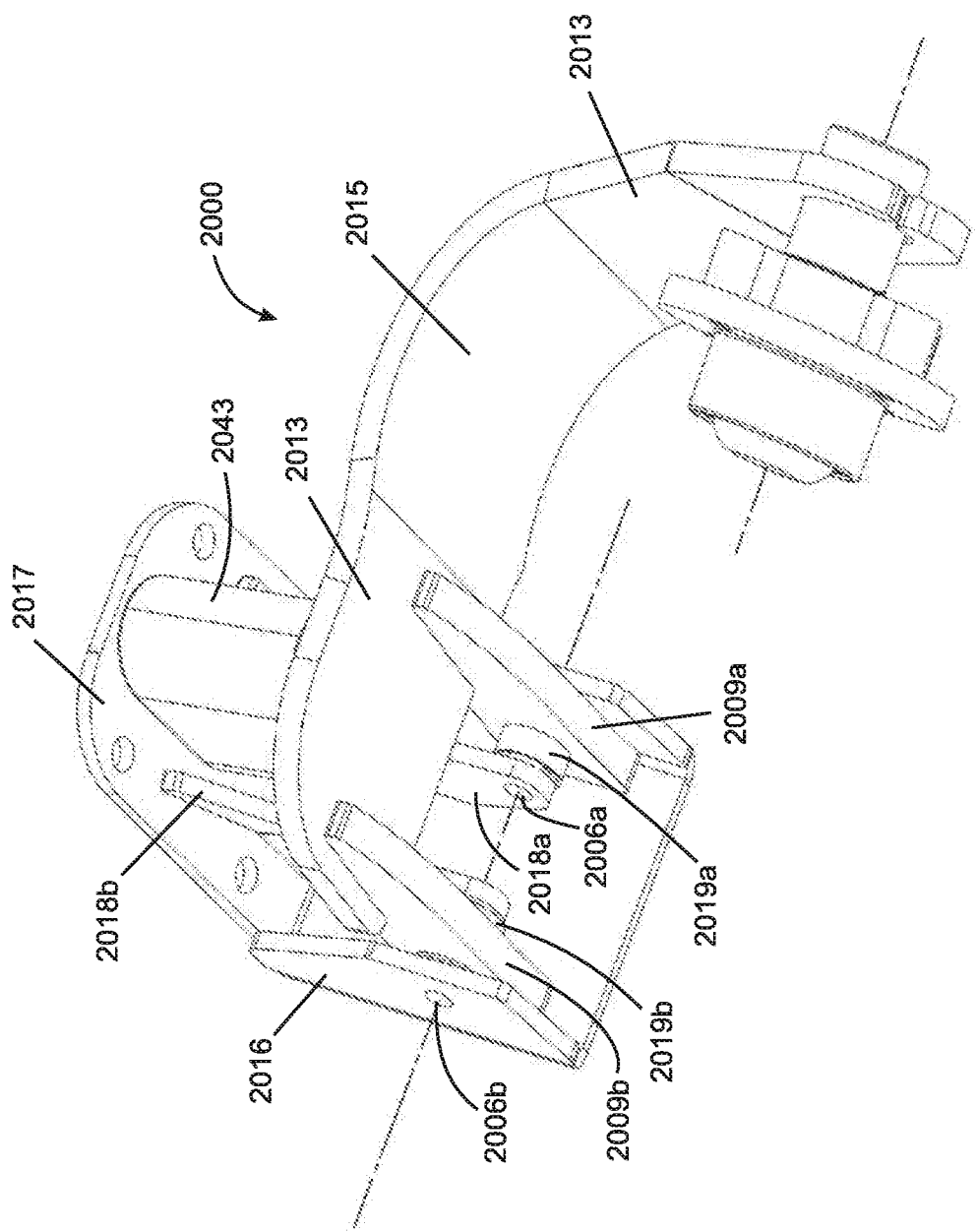

Referring to FIG. 12, an enlarged view of an underside of a lower shank section 2013 of a coulter wheel assembly 2000 without a coulter wheel is shown. The coulter wheel assembly 2000 is an embodiment with a reverse handedness to the coulter wheel assembly depicted in FIG. 6, FIG. 7A, FIG. 7B, FIG. 8A, FIG. 8B, FIG. 9A and FIG. 9B. FIG. 12 shows details of one embodiment of a safety mechanism for the coulter wheel assembly, which may be applied to other embodiments of the coulter wheel assembly. Elbow 2015 of the lower shank section 2013 comprises spring steel to provide resilience. The lower shank section 2013 is mounted to a lower shank mount 2016 between a pair of lugs 2009a, 2009b and a pair of gussets 2018a, 2018b. A resilient block 2043 is provided between the lower shank section 2013 and an upper plate 2017 of the lower shank mount 2016. The lugs 2009a, 2009b allow the lower shank section 2013 to pivot around a pair of pivot pins 2006a, 2006b mounted within resilient bushings 2019a, 2019b, respectively. Pivoting of the lower shank section 2013 about the pivot pins 2006a, 2006b causes compression of the resilient block 2043. The resilient elbow 2015, the resilient block 2043 and to a lesser extent the resilient bushings 2019a, 2019b absorb load caused by deflection of the coulter wheel assembly 2000 when the coulter wheel assembly 2000 strikes a hard obstacle, thereby mitigating damage to the coulter wheel assembly.

While a variety of actuators may be employed, the use of powered actuators permits an operator to change coulter wheel orientation on the fly. For example, with a hydraulic cylinder actuator, an operator in a cab of the transportation can set the coulter wheel orientation as desired to match upcoming soil conditions without the need to stop the tillage apparatus. When minimal soil disturbance is desired, the coulter wheel may be oriented vertically straighter. When greater soil disturbance is desired, the face of the coulter wheel may be angled more out of the vertical plane and angled more away from a normal to the horizontal plane. The orientation of the coulter wheels may be customized to meet specific needs.

Coulter wheel assemblies may be mounted on a transverse frame element in gangs. Each coulter wheel assembly in the gang may be individually controlled, for example each having its own actuator. Individual control of the coulter wheel assemblies permits orienting each coulter wheel differently if desired. If there is no need or desire to provide individually controlled coulter wheel assemblies, two or more of the coulter wheel assemblies may share an actuator so that the two or more assemblies are controllable simultaneously in the same manner.

In one embodiment referring to FIG. 5A, FIG. 5B and FIG. 5C, a gang of three coulter wheel assemblies 100, 110, 120 are shown mounted on a single transverse frame element 900. The coulter wheel assemblies 100, 110, 120 are the same and are the same design as the one depicted in FIG. 1. A cylinder rod 334 of a single hydraulic cylinder 300 is pivotally linked to a rotatable arm 102 of the coulter wheel assembly 100 and rotatable arms 102, 112, 122 of the three coulter wheel assemblies 100, 110, 120, respectively, are linked together by a linkage bar 350. Linear movement of the cylinder rod 334 causes pivoting of the rotatable arm 102, which in turn causes linear translation of the linkage bar 350. Linear translation of the linkage bar 350 causes pivoting of the rotatable arms 112, 122 by the same amount and in the same direction as the pivoting of the rotatable arm 102. As previously described, rotation of the rotatable arms 102, 112, 122 ultimately causes coulter wheels 106, 116, 126, respectively, to change orientations. The three coulter wheels in the gang have the same orientation with respect to each other.

In another embodiment referring to FIG. 10A, FIG. 10B and FIG. 10C, a gang of four coulter wheel assemblies 1100, 1200, 1300, 1400 are shown mounted on a single transverse frame element 1900. The coulter wheel assemblies 1100, 1200, 1300, 1400 are the same and are the same design as the one depicted in FIG. 6. A cylinder rod 1334 of a single hydraulic cylinder 1330 is pivotally linked to a single control arm 1332, which is pivotaly linked to the middle shank sections 1112, 1212, 1312, 1412 of the four coulter wheel assemblies 1100, 1200, 1300, 1400, respectively. Linear movement of the cylinder rod 1334 linear transverse translation of the control arm 1332, which in turn causes the middle shank sections 1112, 1212, 1312, 1412 of the four coulter wheel assemblies to translate transversely by the same amount in an arcuate path. As previously described, translation of the middle shank sections 1112, 1212, 1312, 1412 ultimately causes coulter wheels 1106, 1206, 1306, 1406, respectively, to change orientations. The four coulter wheels in the gang have the same orientation with respect to each other.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. An angle adjustable coulter wheel assembly comprising:
   a) a rotatable shank having an upper portion oriented neither vertically or horizontally with respect to the ground when the assembly is mounted on a tillage apparatus;
   b) a coulter wheel rotatably mounted on the shank proximate a lower portion of the shank, the coulter wheel comprising a face and an edge; and,
   c) an actuator for rotating the upper portion of the shank, wherein the shank has a longitudinal axis and rotation of the shank about the longitudinal axis causes the face of the coulter wheel to rotate about three orthogonal axes thereby changing orientation of the face of the coulter wheel with respect to the ground when the assembly is mounted on the tillage apparatus.

2. The assembly according to claim 1, wherein a point of first ground contact on the coulter wheel is on the longitudinal axis of the upper portion of the shank.

3. The assembly according to claim 1, wherein the lower portion of the shank is transversely offset from the longitudinal axis of the upper portion of the shank.

4. The assembly according to claim 3, wherein at least a majority of the face of the coulter wheel is between the lower portion of the shank and the longitudinal axis of the upper portion of the shank.

5. The assembly according to claim 4, wherein the upper and lower portions of the shank are rigidly connected so that rotation of the upper portion of the shank causes rotation of the lower portion of the shank.

6. The assembly according to claim 1, wherein the shank comprises a first elbow directing the shank away from the longitudinal axis of the upper portion of the shank and a second elbow closer to the lower portion of the shank directing the shank at least partially back toward the longitudinal axis of the upper portion of the shank but longitudinally away from the upper portion of the shank.

7. The assembly according to claim 1, wherein the upper and lower portions of the shank are connected by an intermediate portion of the shank, the intermediate portion of the shank angled away from the longitudinal axis.

8. The assembly according to claim 7, wherein the actuator comprises a hydraulic actuator operatively connected to the intermediate portion of the shank whereby extension of the actuator causes rotation of the upper portion of the shank about the longitudinal axis.

9. The assembly according to claim 8, wherein the hydraulic actuator is connected to the shank by a linkage arm.

10. The assembly according to claim 1, wherein the actuator comprises a hydraulic actuator operatively connected to the upper portion of the shank whereby extension of the actuator causes rotation of the upper portion of the shank about the longitudinal axis.

11. The assembly according to claim 1, further comprising an actuator mount for mounting the actuator on to a cultivator frame and a shank mount for mounting the shank to the cultivator frame.

12. The assembly according to claim 1, wherein the coulter wheel comprises a hub rotatably mounted on a shaft extending from the lower portion of the shank toward the longitudinal axis of the upper portion of the shank.

13. The assembly according to claim 1, further comprising a safety mechanism for protecting the coulter assembly from being damaged by forces caused when the coulter wheel assembly is deflected by striking a hard object, an immovable object or a hard, immovable object.

14. A tillage apparatus comprising:
   (a) a cultivator frame; and,
   (b) at least one coulter wheel assembly as defined in claim 1 mounted on the cultivator frame.

15. The tillage apparatus according to claim 14, wherein the at least one coulter wheel assembly comprises a plurality of coulter wheel assemblies.

16. The tillage apparatus according to claim 14, wherein one actuator effects rotation of the upper portion of the shanks of at least two coulter wheel assemblies.

17. The tillage apparatus according to claim 14, wherein the at least one coulter wheel assembly comprises two or more transverse rows of coulter wheel assemblies.

18. A method of tilling a field comprising dragging the tillage apparatus as defined in claim 14 across the field with the coulter wheels of the at least one coulter wheel assembly engaged with soil in the field.

19. The method according to claim 18, further comprising changing the orientation of the face of the coulter wheel with respect to the field in both a horizontal plane and a vertical plane.

20. The method according to claim 19, wherein the orientation is changed while the tillage apparatus is moving.

21. The method according to claim 19, wherein the orientation is changeable through an amount up to about 30 degrees with respect to the field in both the horizontal plane and the vertical plane.

22. The method according to claim 19, wherein the orientation is changeable through an amount up to about 25 degrees with respect to the field in both the horizontal plane and the vertical plane.

\* \* \* \* \*